2 Sheets—Sheet 1.
M. L. DEERING,
Assignor to THE UNION PAPER BAG MACHINE COMPANY.
MANUFACTURE OF PAPER BAGS.
No. 10,083. Reissued Apr. 11, 1882.
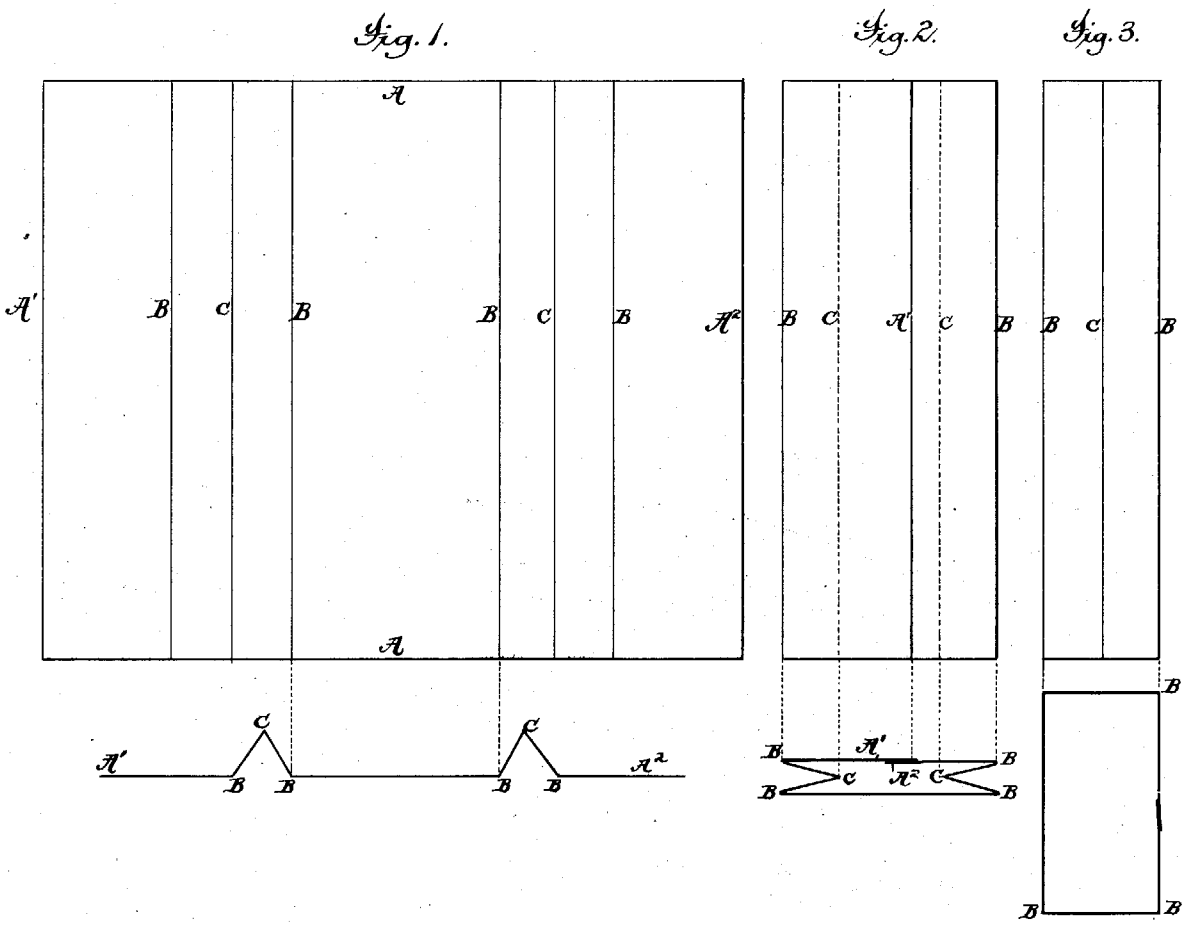
Attest;
Geo. H. Graham
A. S. Jastera
Inventor;
Mark L. Deering,
by Munson & Philipp
Attys.

2 Sheets—Sheet 2.
M. L. DEERING,
Assignor to THE UNION PAPER BAG MACHINE COMPANY.
MANUFACTURE OF PAPER BAGS.
No. 10,083. Reissued Apr. 11, 1882.
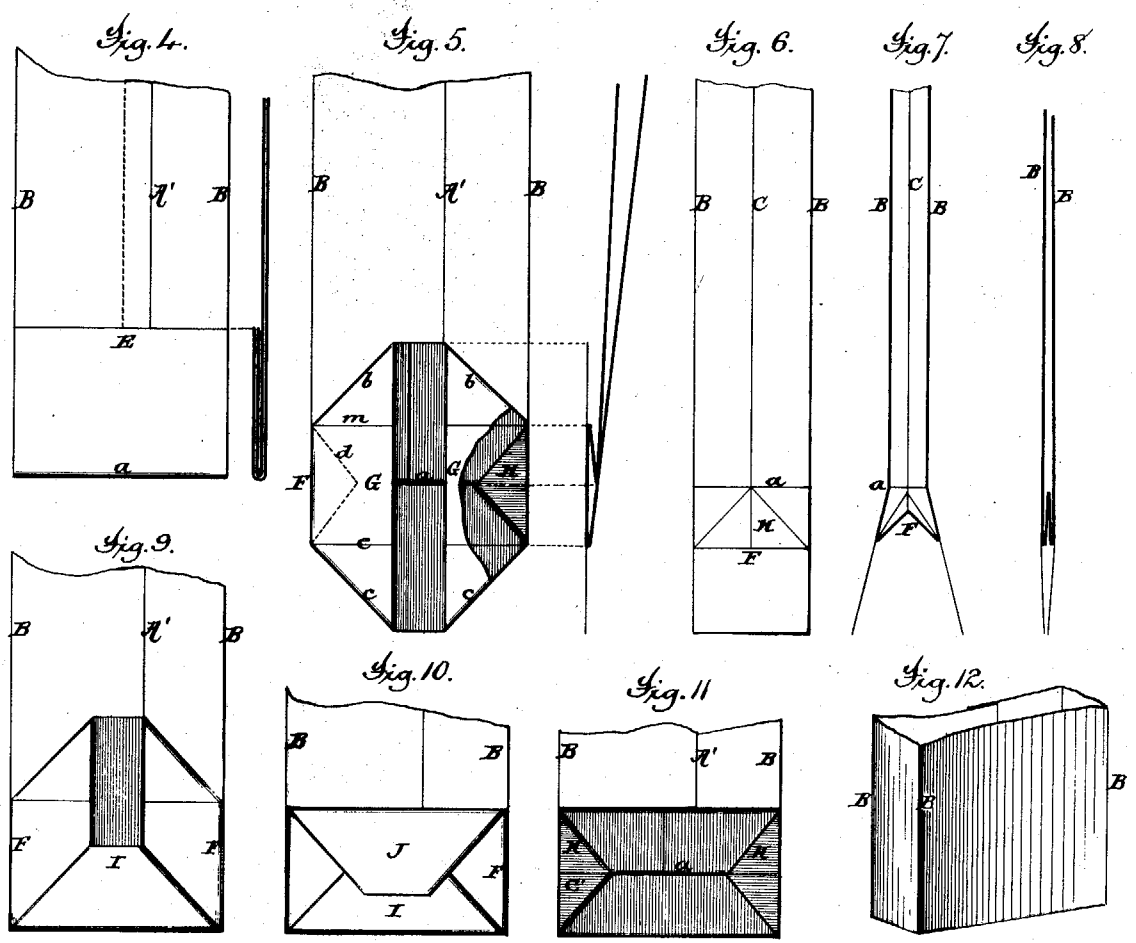
Attest;
Geo. H. Graham
A. H. Jasbera
Inventor;
Mark L. Deering,
by Munson & Philips
Att'ys.

UNITED STATES PATENT OFFICE.

MARK L. DEERING, OF CLEVELAND, OHIO, ASSIGNOR TO THE UNION PAPER BAG MACHINE COMPANY, OF PHILADELPHIA, PENNSYLVANIA.

MANUFACTURE OF PAPER BAGS.

SPECIFICATION forming part of Reissued Letters Patent No. 10,083, dated April 11, 1882.

Original No. 227,350, dated May 11, 1880. Application for reissue filed November 29, 1881.

*To all whom it may concern:*

Be it known that I, MARK L. DEERING, a citizen of the United States, residing in the city of Cleveland, in the county of Cuyahoga and State of Ohio, have invented new and useful Improvements in the Manufacture of Paper Bags, of which the following is a description.

The nature of this invention relates to forming paper bags with such bottoms that said bags, when distended, shall have flat bottoms of rectangular form on which to stand erect and unsupported when filled; and said invention consists in the method or process of manufacture, as well as in the article of manufacture produced.

The outlines of Figure 1 represent a sheet of paper or blank from which to make a bag. The several lines drawn across the blank indicate the first foldings of the paper in the process of making a bag. Fig. 2 represents a side view of the blank folded up to form a bottomless cylinder or tube with bellows-side folds, shown as compressed together, or nearly so. Fig. 3 represents an edge view of such a cylinder, tube, or body of the bag when distended. Fig. 4 represents a view of the tube or body of the bag in the second folding of the process of forming the bag. Fig. 5 represents the third foldings in the process, the bottom being distended, and, together with the sides of the tube or bag, shown as compressed or laid flat. Fig. 6 represents an edge view of the tube or bag folded as in Fig. 5 as it appears when its bellows-side folds and bottom folds are extended so as to form a rectangular tube with straight walls, and particularly shows the various creases made by the foldings as exposed by one side wall of the tube. Fig. 7 represents a similar edge view of the tube or bag, but with its bellows-side folds partially compressed, the side laps of its bottom folded inward, and the triangular portions of its bottom partially bent inward, the final lapping portions of the bottom remaining extended. Fig. 8 represents an edge view of the tube or bag when its parts, disposed as in Fig. 7, are wholly compressed or flattened down. Fig. 9 illustrates the fourth folding of the tube or bag. Fig. 10 illustrates the fifth folding, which completes the bag. Fig. 11 illustrates an inside view of the bag-bottom folded as shown in Fig. 10 when its forward and rearward and side lappings are opened. Fig. 12 is a perspective view, showing the bag as opened out in use, the upper portion being, for convenience, shown as removed.

In order to make the said bag, a sheet of paper, termed a "blank," (represented by the outlines A of Fig. 1,) is folded by any suitable means in direction of the lines B and C. The lines B form the corners of the bag when extended as in Fig. 12. This folding is the first in the process of making the bag. The two sides $A'$ $A^2$ are then brought together and lapped one upon the other, as seen in Fig. 2, and secured by pasting or otherwise. The dotted lines C in Fig. 2 correspond with the lines C in Figs. 1 and 3. The body of a bag-tube thus formed, by foldings on the lines B C and lapping of the sides $A'$ $A^2$, produces a rectangular tube when distended, as is shown in Fig. 3, and when the sides are compressed together, as is shown in Fig. 2, the lines C of Fig. 1 are indicated by the folds C in said Fig. 2. This completes the first foldings in the process of making the bag and produces a so-called "bellows-sided" tube.

The bottom of the bag is now to be made. To this end a certain portion of one end of the tube, on being compressed together, is creased and doubled back onto the bag, making a lap, E, Fig. 4, and the crease *a*, (shown in Fig. 6.) This makes the second folding in the process.

The third fold is made by turning the lap E up at about a right angle to the body of the bag and distending it, as shown in Fig. 5, then forming across the ends of the upturned lap a crease, F, Fig. 6, by pushing inward the material above this crease and folding it down upon the bag, making the laps G G, Fig. 5, both of which are alike. One end—the rearward—of these laps lies upon the bag back of the crease *a*, as seen at *b b*. The other end of said laps extends forward of said crease, as shown at *c c* in Fig. 5. This manipulation of the bag not only forms the two side laps, G G, but also the triangular folds H H, Figs. 5, 6, and 11. A portion of one lap G is shown as torn away to expose the triangular fold.

The fourth fold in the process is made by folding the forward portion of the laps G along the line *c*, Fig. 5, and doubling it down upon the bag, forming the lap I, Fig. 9, which is secured in place by the application of paste along the edge of the lap.

The fifth fold is made in like manner by folding over onto the lap I the rearward portion of the laps G G, which is folded along the line *m*, Fig. 5, forming the lap J, Fig. 10, which in like manner is secured with paste applied to the edges of the lap. It is not essential that the lap I be first made. The lap J may be made first and the lap I doubled onto it. This last folding completes the bottom of the bag, an external view of which is shown in Fig. 10.

In making bags it is not necessary that a single sheet or blank shall be used for each bag. A long strip of paper may be treated with the first foldings and pasted, as herein described of the blank Fig. 1, thereby forming a long tube, which may be cut into lengths for bags.

The bag herein described is represented as an oblong square. Bags, however, of other rectangular forms can be made by the same or similar foldings and laps without changing the nature of the invention.

What I claim is—

1. The herein-described process or method of forming paper bags by making in a sheet of paper or blank the folds B and C, then pasting together the two sides $A' A^2$, forming a bellows-sided body or tube of the bag, then spreading open one end of said body or tube, then forming the inwardly-projecting triangular folds H H, side laps, G G, and laps I J, which latter are secured in place by pasting or otherwise, substantially as described.

2. A bag consisting of a bellows-sided tube having a satchel-bottom and inward triangular folds, which form part of its two sides when distended.

In testimony whereof I have hereunto signed my name this 14th day of November, 1881.

MARK L. DEERING.

Witnesses:

W. H. BURRIDGE,

J. H. BURRIDGE.